United States Patent Office 3,379,426
Patented Apr. 23, 1968

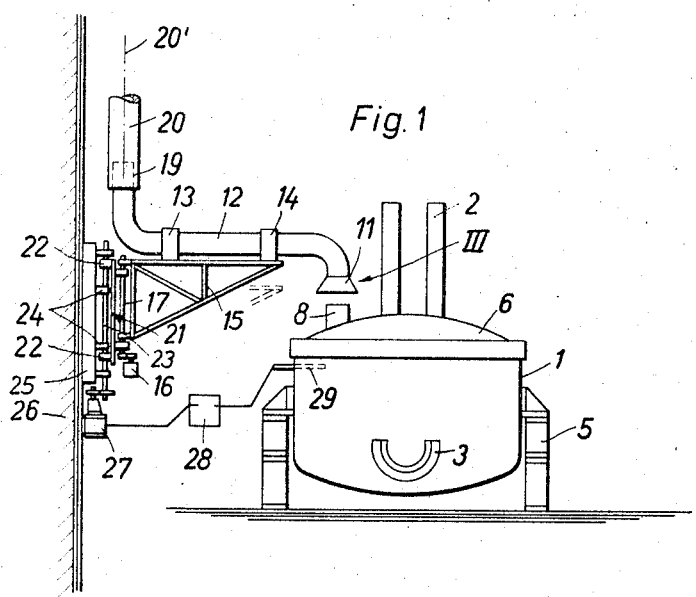

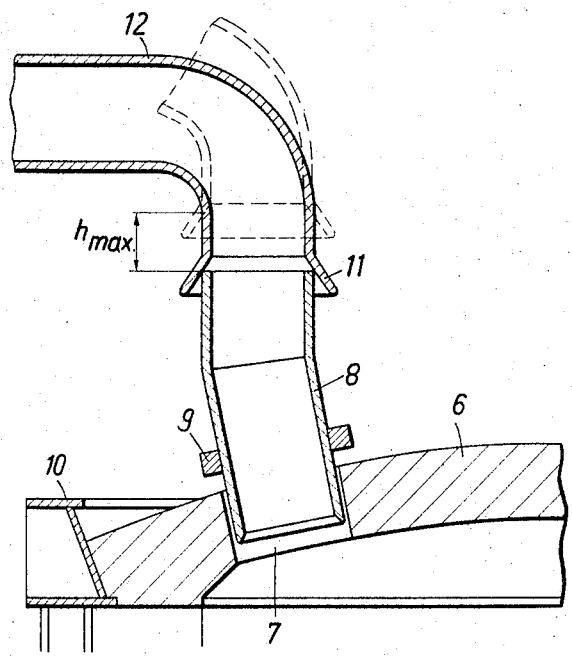

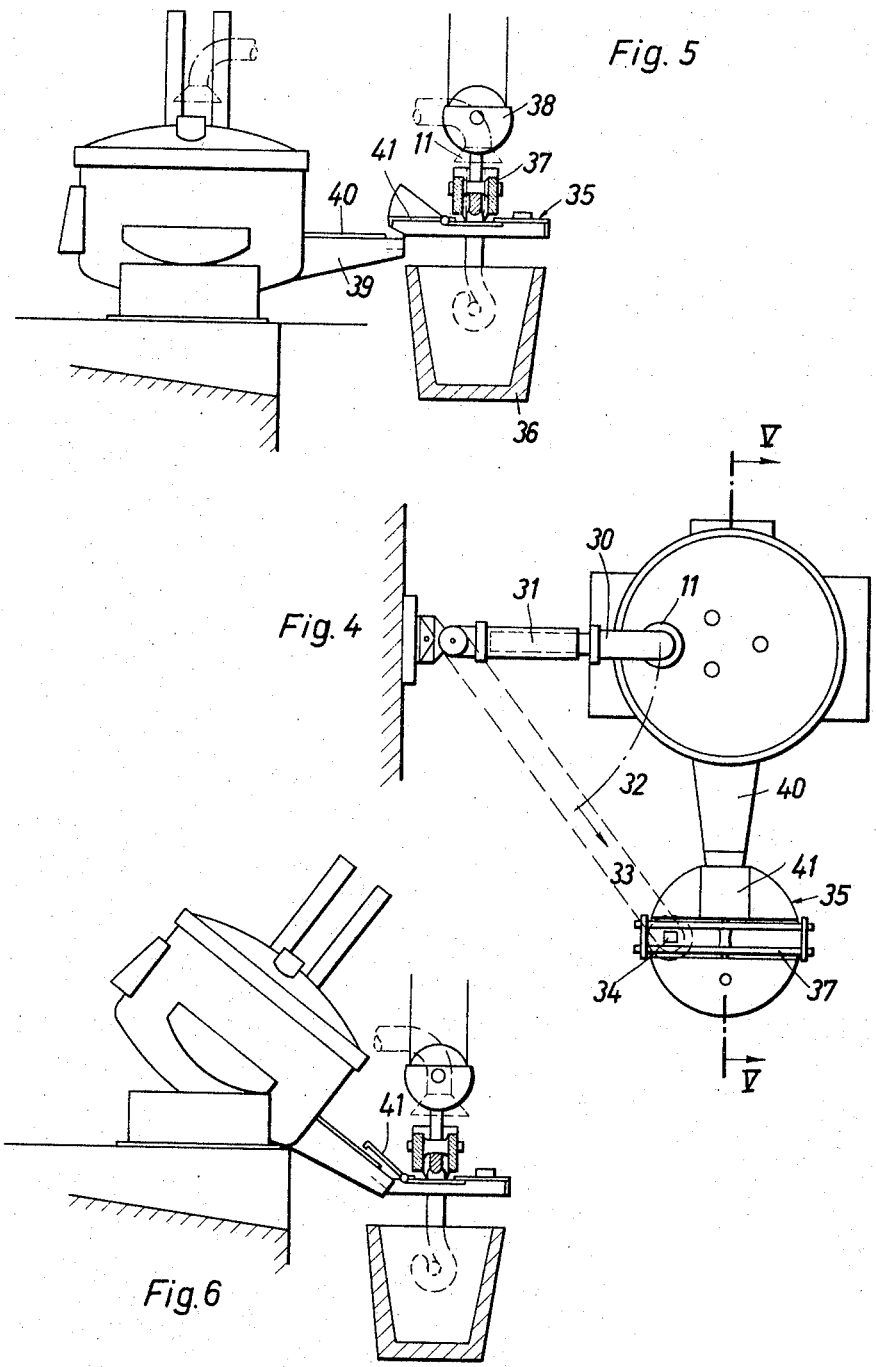

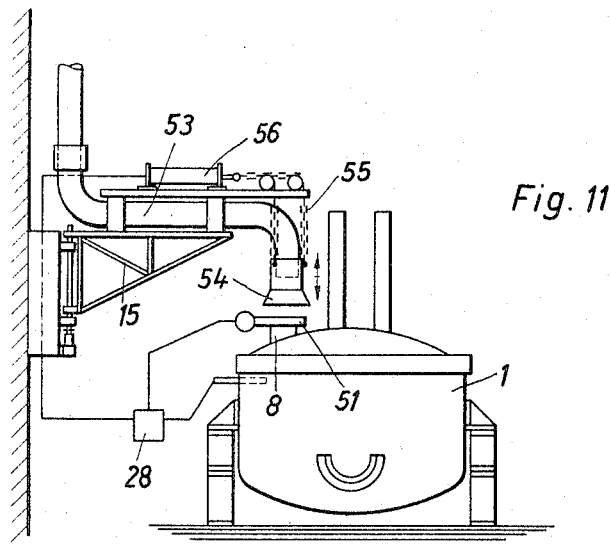
Fig. 11
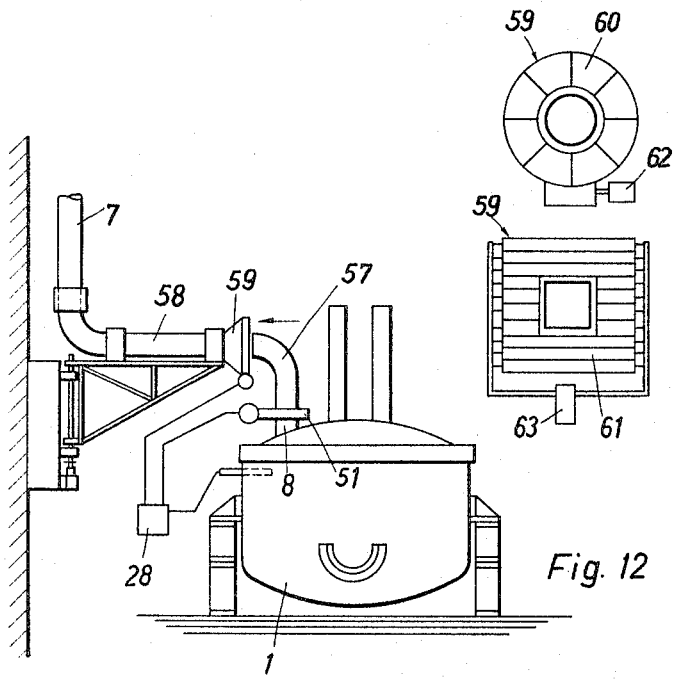
Fig. 12
Fig. 13
Fig. 14

3,379,426
SUCTION DEVICE FOR AN ELECTRIC
ARC FURNACE
Guido Reuter, Dusseldorf-Oberkassel, Walter Jesdinsky, Buderich, and Ewald Werthmoller, Strump (Lower Rhine, Germany, assignors, by mesne assignments, to Rheinstahl, ECO G.m.b.H., Hilden, Rhineland, Germany
Filed Mar. 18, 1965, Ser. No. 440,805
Claims priority, application Germany, May 21, 1964, G 40,649
14 Claims. (Cl. 266—31)

ABSTRACT OF THE DISCLOSURE

A suction device adapted for cooperating with the outlet of an electric arc furnace in which a suction pipe having adjustable nozzle means at an end thereof faces the outlet and wherein the nozzle means is displaced relative to the outlet in response to the pressure in the furnace to vary the suction force applied thereto by varying the amount of ambient air drawn into the nozzle means.

The invention relates to suction devices for electric arc furnaces for the production of steel. More particularly, the invention relates to such suction devices which are adapted for connection to dust removal apparatus. It is known to provide such suction devices with a suction pipe and a nozzle, said nozzle being adapted to be associated with a tubular connection or socket of the furnace cover to permit dust removal therefrom.

It is an object of the invention to provide a suction device of the above-mentioned kind, wherein dust deposits in a horizontal portion of the suction pipe are avoided. In addition, the device is suitable for being operated to produce low-nitrogen steel in the reduction period of the furnace. Moreover, a suction operation is also possible during the tapping of the furnace.

According to the invention, the nozzle is adjustable by a device controlled in response to the furnace pressure such that the suction effect can be varied by adjusting the suction intake of ambient air.

In the suction device according to the invention, the normal throttle control therefor is replaced by a means for the control of the intake of ambient air entering the air gap between the outlet or socket of the furnace and the nozzle. The velocity of flow in the suction pipe is, therefore maintained substantially constant in all operating conditions of the furnace, so that the dust has no opportunity to settle. The suction device may, therefore, be controlled by a furnace pressure regulator.

To control the suction effect, a funnel-shaped nozzle may be axially adjustable by a device controlled in response to the furnace pressure. The invention also provides that the suction pipe be formed as an S-shaped pipe positioned on a vertically adjustable, pivotable bracket, the end of the tube remote from the nozzle being telescopically connected to the suction pipe. Alternatively, the nozzle may be a member capable of itself being raised and lowered in telescopic fashion with the suction pipe by means of a telescopic sleeve on the suction nozzle.

If the pivotable suction pipe is to be pivoted to a position over the casting ladle during the tapping of the furnace, the invention also provides that the S-shaped suction pipe be formed so that its length can be changed by a horizontal telescopic connection. Alternatively, a non-extensible suction pipe may be pivoted about an axis arranged in such a position that the tubular connection or socket of the furnace cover and the socket of a suction screen of the casting ladle are located on a circular arc having said axis as its center. Thereby, the suction pipe may be alternatively positioned over the socket of the furnace or the socket of the ladle.

If the device according to the invention is also to be used for suction operations during the refining period, where it is important that the furnace pressure remain as close as possible to atmospheric with fluctuations only into the excess-pressure range by use of a furnace pressure regulator then in further accordance with the invention there is provided a high-speed adjustment with a throttle valve arrangement or the like arranged in the tubular connection or socket of the furnace, said throttle valve being in controlled combination with the suction device. This function may also be achieved by adjusting the suction draft of the fan of the suction pipe by change of its speed or the like, or else, if it is not necessary to obtain the other above-mentioned advantages, other devices may be used for the high-speed adjustment of the suction effect.

Several embodiments of the invention will next be described by way of example in conjunction with the accompanying drawing, in which:

FIGURE 1 is a diagrammatical side view of an electric arc furnace for the production of steel with a suction device operated by a regulator;

FIGURE 2 is a top view of the furnace with the suction device as shown in FIG. 1;

FIGURE 3 is an enlarged view, in longitudinal section, of a portion of FIG. 1, showing in solid lines the lowest position of the suction device: the highest position corresponding being indicated in dotted lines;

FIGURE 4 is a top view corresponding to FIG. 2, but with a telescopically extensible suction pipe and, additionally, with a suction screen of a casting ladle;

FIGURE 5 is a longitudinal section taken along line V—V of FIG. 4;

FIGURE 6 shows the apparatus according to FIG. 5 in the lowest position of the ladle;

FIGURE 11 is a view of an arrangement similar to that of FIG. 9, but with a nozzle which can be telescopically raised and lowered with respect to the suction pipe;

FIGURE 12 is a view of an arrangement similar to that of FIG. 9, but with a bent tubular connection or socket and a horizontally terminating suction pipe;

FIGURE 13 is a view in the direction of the arrow of FIG. 12, showing a nozzle with rotary slide valve closure shutter; and FIGURE 14 is a view in the direction of the arrow of FIG. 12, showing a modified nozzle with a Venetian-type shutter.

Figure 7:
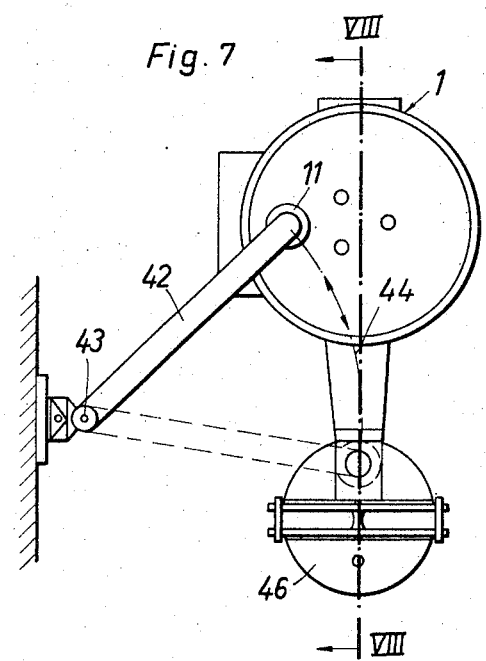
FIGURE 7 shows in plan an arrangement similar to that of FIG. 4, but with a non-extensible suction pipe.

In the drawings there is shown an electric arc furnace 1 which electrodes 2. The furnace 1 is provided with a tap 3, and with a filling door 4. The furnace 1 is supported for tilting movement on a frame 5. The furnace is provided with a cover 6 and with a suction opening 7 (FIG. 3) in the cover. Mounted in said opening is a tubular connection or socket 8 which, by means of a flange 9, is fixed to the frame 10 of the cover in a manner not shown in the drawing. A funnel 11, is positioned in extension of the vertical upper end of the tubular connection or socket 8, and can be raised and lowered. The funnel 11 is firmly connected to an S-shaped suction pipe 12. The funnel constitutes a nozzle for the suction pipe 12. Between the nozzle 11 and the socket 8 there exists an adjustable air gap "$h$" which varies between zero and $h_{max}$ (FIG. 3).

The suction pipe 12 is fixed, by means of clips or clamps 13 and 14, to a lattice bracket 15 which can be pivoted in the direction of arrow 18 (FIG. 2) by a shaft 17 which is driven by means of a pivoting drive 16. The end 19 of the suction pipe, which is remote from the nozzle 11, is rotatably connected in telescopic fashion to a suction conduit or piping 20, having an axis 20' which is in alignment with the shaft 17. The suction conduit leads by way of a fan, or the like (not shown), to an electrostatic filter (not shown).

A non-pivotable frame 21 supports the shaft 17 of the bracket 15. The frame 21 is mounted, by means of a pair of nuts 22, on a threaded spindle 23, which is rotatable in bearings 24 of a base frame 25. The base frame is secured to a bay wall 26 or the like. A reversible spindle drive 27 can be selectively connected and disconnected with spindle 23 to drive the same by means of a regulator 28. A control device is connected to the regulator to operate the same, said control device being a pressure measuring device 29 which is connected in the heating chamber of the furnace. In operation, the regulator 28 is set to a position for obtaining a particular pressure in the upper chamber of the furnace. The spindle drive is then activated in accordance with the pressure prevailing in the upper chamber as measured by device 29 to raise or lower the pipe 12 and the nozzle 11 therewith to a position in which the desired pressure is obtained in the upper chamber.

When the furnace is being charged, the suction device is disconnected from the connection 8 and pivoted to an inoperative position. During the melting-down period, the suction device is in the position shown in the drawing. The regulator is set in such a manner that a reduced pressure of, for example, 1.0 to 1.5 mm. water prevails in the heating chamber. Said pressure is established and maintained by adjustment of the air gap $h$.

In addition to the furnace gases drawn from the socket 8, the nozzle 11 sucks in ambient air. The suction at the outlet of the nozzle 11 therefore can be maintained substantially constant, and variation of suction in the furnace can be effected by the position of the nozzle 11 with respect to the socket 8, which has the effect of varying the amount of ambient air drawn into the suction pipe. The velocity of flow at the nozzle 11 and therefore in the horizontal section of the suction pipe 12 is constant and is sufficiently high so that no appreciable quantity of dust is deposited in the pipe 12.

The suction device maintains the above said setting also during boiling of the steel bath. However, during the subsequent reduction period, the setting of the regulator is adjusted such that the pressure in the heating chamber is exactly equal to or slightly above the ambient pressure. This will prevent secondary air, which is harmful for the reduction process, from entering the furnace through the charging door 4 and/or the tap 3.

In order to be able to operate the suction device during the tapping of the furnace, a telescopic connection 31 is built into the horizontal section of the suction pipe 30, as shown in the embodiment in FIG. 4. The nozzle 11, to which a radial motion 33 may be imparted in addition to the pivoting motion 32, can thereby be connected to a socket 34 of a suction screen 35 of a casting ladle 36.

The ladle 36 is suspended from a crane gear 38 by means of a conventional suspension gear. The suction screen 35 is secured to the underside of the transverse support of the crane gear and has a free distance from the top edge of the ladle 36. Said distance is established by a stopper rod (not shown) of the ladle 36.

The gutter or tapping spout 39 of the furnace is covered with a metal sheet 40 which is connected to a hinged cover 41 of the suction screen 35. This has the effect that the gutter will also be subjected to suction during the tapping of the furnace. It is the function of this arrangement that only a minimum of gases and vapors will be able to reach the hall of the foundry or casting bay during the tapping of the furnace.

Figure 8:
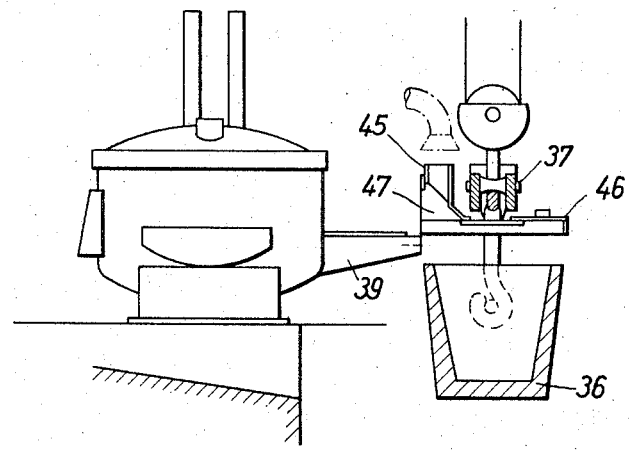
FIGURE 8 is a longitudinal section taken along the line VIII—VIII of FIG. 7 in perspective view.

An alternative embodiment according to FIG. 7 uses a non-extensible suction pipe 42, and thereby dispenses with the telescopic connection 31 shown in FIG. 4. The pivot 43 of the bracket of the suction pipe 42 is arranged to provide a pivoting circular arc 44. The nozzle 11 of the suction pipe may be thus positioned either above the socket 8 of the furnace or above a socket 45 of the suction screen 46 according to FIG. 8. Suction screen 46 comprises a fixed hood 47 instead of the hinged cover 41 of FIG. 5. The socket 45 is arranged on said hood 47. As can be clearly seen from the drawing, this arrangement has the effect that both the range of the ladle and the range of the gutter 39 are located in the range of the suction pipe 42.

During the tapping, the furnace tilts to the position shown in FIG. 6. The casting ladle 36 is lowered accordingly from the crane. Consequently, the suction pipe will also have to be readjusted with the aid of the vertical adjustment according to FIG. 1 of the ladle, so that the suction process is not interrupted. The free distance between the nozzle 11 of the suction pipe and the sockets 34 and 45 respectively should be as small as possible, and preferably, the nozzle is seated directly on the socket to obtain a miximum suction effect.

Figure 9:
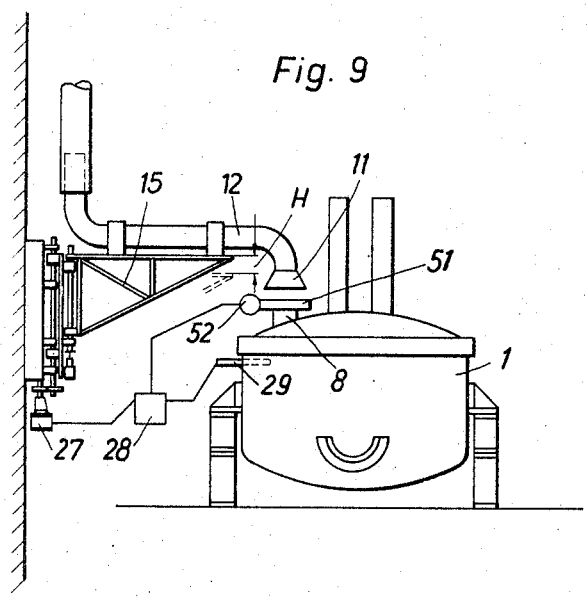
FIGURE 9 is a view of an electric arc furnace similar to that of FIG. 1, but with an iris diaphragm in the tubular connection or socket of the cover.
Figure 10:
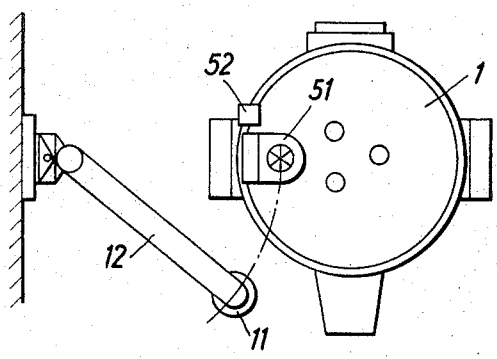
FIGURE 10 is a top view of the arrangement according to FIG. 9.

According to FIGS. 9 and 10, which is similar to the arrangement according to FIG. 1, a throttle slide valve 51 in the form of an iris diaphragm is mounted on the socket 8. A drive 52 for opening and closing the diaphragm is connected to the regulator 28.

In the arrangement according to FIG. 11, the bracket 15 is vertically fixed and is not adjustable. In this arrangement, a nozzle 54, separate from the remaining length of a suction pipe 53 (which otherwise corresponds to the suction pipe 12) can be independently raised and lowered. The top portion of the nozzle 54 is formed as a telescopic sleeve, while the bottom portion is in the form of a suction nozzle. The nozzle 54 is suspended from chains 55 which can be raised and lowered by a drive cylinder 56.

In the arrangement according to FIG. 12, the socket comprises an extension 57 which is bent at an angle to provide a horizontally terminating suction pipe 58. This results in the arrangement wherein the extension 57 of the socket terminates just ahead of a nozzle 59. Nozzle 59 has either a round shape as shown in FIG. 13 or a square shape as shown in FIG. 14. The surface of the nozzle which is not covered by the extension of the socket can be set at intermediate positions by a rotary valve shutter 60 according to FIG. 13 or by a Venetian-type shutter 61 according to FIG. 14. The drive 62 of the rotary valve shutter 60 or the drive 63 of the Venetian-type shutter 61 is connected to the regulator 28, whose other connections are similar to those shown in FIG. 11.

The arrangements according to FIGS. 9 to 14 offer the following alternatives for regulating the furnace pressure:

According to one alternative, the throttle valve 51 occupies a middle position predetermined by the regulator 28, and the nozzles 11, 54 or 59 of the suction devices are positioned, respectively, by the regulator in such a manner that the middle position of adjustment of the throttle valve 51 corresponds to the rated or reference pressure of the furnace. The throttle valve reacts immediately to disturbances of the pressure by its comparatively small mass inertia and, if necessary, by suitable connection adjustment in the regulator, thereby keeping said pressure constant. The balancing-out of the respective middle position of the valve 51 may take place comparatively slowly.

According to the other alternative, when the nozzle 11 or 54 occupies a comparatively great distance from the throttle slide 51 it is arrested in said position. In the embodiment according to FIG. 12, in this position the slide shutter 60 or the Venetian-type shutter 61 is open, so that the suction effect on the furnace is comparatively small in both cases, although the velocity of the gases inside the suction pipe remains almost constant. At this pressure level, the control by the raisable and lowerable nozzles 11 or 54 or by the shutters 60 or 61 of the fixed nozzle 59 is comparatively insensitive, and thereby slight disturbances of the furnace pressure are adjusted or balanced solely by the throttle valve 51.

It is known that a very accurate measuring of the furnace pressure is difficult, especially in the center of the furnace. Since there exists a functional relationship between the pressure in the center of the furnace and, for example, the pressure under the furnace cover, control of the latter is effectively obtained even if the pressure range is further above the zero point in the zone below the furnace cover during the refining operation.

Numerous modifications and variations of the disclosed method and apparatus of the invention will become apparent to those skilled in the art without departing from the scope and spirit of the invention as defined in the attached claims.

What is claimed is:

1. A suction device adapted for cooperating with the outlet of an electric arc furnace, said device comprising a suction pipe having an end and including adjustable nozzle means at said end, said furnace having a body provided with said outlet, means in said furnace body for measuring the suction pressure therein, a throttle slide valve in the outlet of the furnace for controlling the degree of opening thereof, and control means associated with the pressure measuring means and with said nozzle means and throttle slide valve for cooperatively adjusting the nozzle means and slide valve in response to the pressure in said furnace body to vary the suction force applied thereto by varying the amount of ambient air drawn into the nozzle means.

2. A suction device as claimed in claim 1 wherein said nozzle means comprises a funnel shaped nozzle and the control means for adjusting the nozzle means comprises support means for the nozzle, and means engaging the support means and coupled to the pressure measuring means for displacing the support means, and the funnel shaped nozzle therewith with respect to the furnace outlet in accordance with the pressure in the furnace body.

3. A suction device as claimed in claim 2 wherein said suction pipe is S-shaped, said support means comprising a bracket supporting the pipe, and means supporting the bracket for pivotal movement about a vertical axis, said suction device further comprising a suction conduit vertically aligned with said axis and telescopically accommodating the suction pipe therein at the end thereof remote from said nozzle for rotatable movement.

4. A suction device as claimed in claim 1 wherein said nozzle means comprises a member including a funnel shaped nozzle and a sleeve attached therewith; said suction pipe telescopically accommodating the sleeve of the latter member, said control means for adjusting the nozzle means comprising means engaging said member to raise and lower the same with respect to said suction pipe.

5. A suction device as claimed in claim 1 wherein said nozzle means comprises a funnel shaped nozzle, said control means which adjusts the nozzle means including means operatively associated with the nozzle means to axially displace the nozzle.

6. A suction device as claimed in claim 5 wherein said suction pipe comprises a horizontal telescopic portion which is pivotally mounted and extensible and retractable to enable the nozzle to be selectively located in first and second positions, said nozzle in the first position being aligned with the outlet of the furnace body, the nozzle in the second position being adapted for engaging a socket outlet of the suction screen of a casting ladle.

7. A suction device as claimed in claim 3 wherein said suction device is adapted for engaging a socket outlet of a suction screen of a casting ladle, said nozzle being positioned with said axis to describe an arc upon rotation about said axis which coincides with the outlet of the furnace and the outlet of the suction screen.

8. A suction device as claimed in claim 1 wherein said suction pipe includes a horizontal terminal portion, the nozzle means comprising a nozzle on said terminal portion at the end thereof and facing horizontally, said outlet of the furnace comprising a socket including a vertical portion and a horizontal portion, said nozzle being proximate said horizontal portion, the nozzle having a central restricted portion which corresponds to the size of the horizontal portion of the socket and a surrounding peripheral portion, said control means comprising means in said peripheral portion for controlling the opening thereof and thereby the quantity of ambient air admitted into said nozzle.

9. A suction device as claimed in claim 8 wherein said means in said peripheral portion comprises a rotary shutter including adjustable slide members.

10. A suction device as claimed in claim 8 wherein said means in said peripheral portion comprises a Venetian-type shutter.

11. A suction device as claimed in claim 1 wherein said control means comprises a control system controlling the throttle slide for high-speed adjustment preceding adjustment of the nozzle means, and a compensation control to keep the throttle slide, substantially in middle position by adjustment of the nozzle means.

12. A suction device as claimed in claim 1 wherein said control means comprises a control system coupled to the throttle slide and a drive means coupled to the nozzle means for terminating the adjustment of the suction device when a position of minimum suction effect has been reached after which additional adjustment is effected solely by the throttle slide.

13. A suction device as claimed in claim 11 wherein said throttle slide is an iris-type diaphragm which provides gradually varying central openings therein when adjusted.

14. A suction device as claimed in claim 12 wherein said throttle slide is an iris-type diaphragm which provides gradually varying central openings therein when adjusted.

References Cited

UNITED STATES PATENTS

| | | | |
|---|---|---|---|
| 2,295,901 | 9/1942 | Jones | 266—31 X |
| 2,964,304 | 12/1960 | Rice | 266—31 X |
| 3,154,406 | 10/1964 | Allard | 266—31 X |
| 3,173,980 | 3/1965 | Hysinger | 266—15 X |
| 3,205,810 | 9/1965 | Rosenak | 266—31 X |

J. SPENCER OVERHOLSER, *Primary Examiner.*

E. MAR, *Assistant Examiner.*